Aug. 29, 1933.  W. E. HARVIE  1,924,991
CULINARY MACHINE
Filed June 8, 1932  4 Sheets-Sheet 1
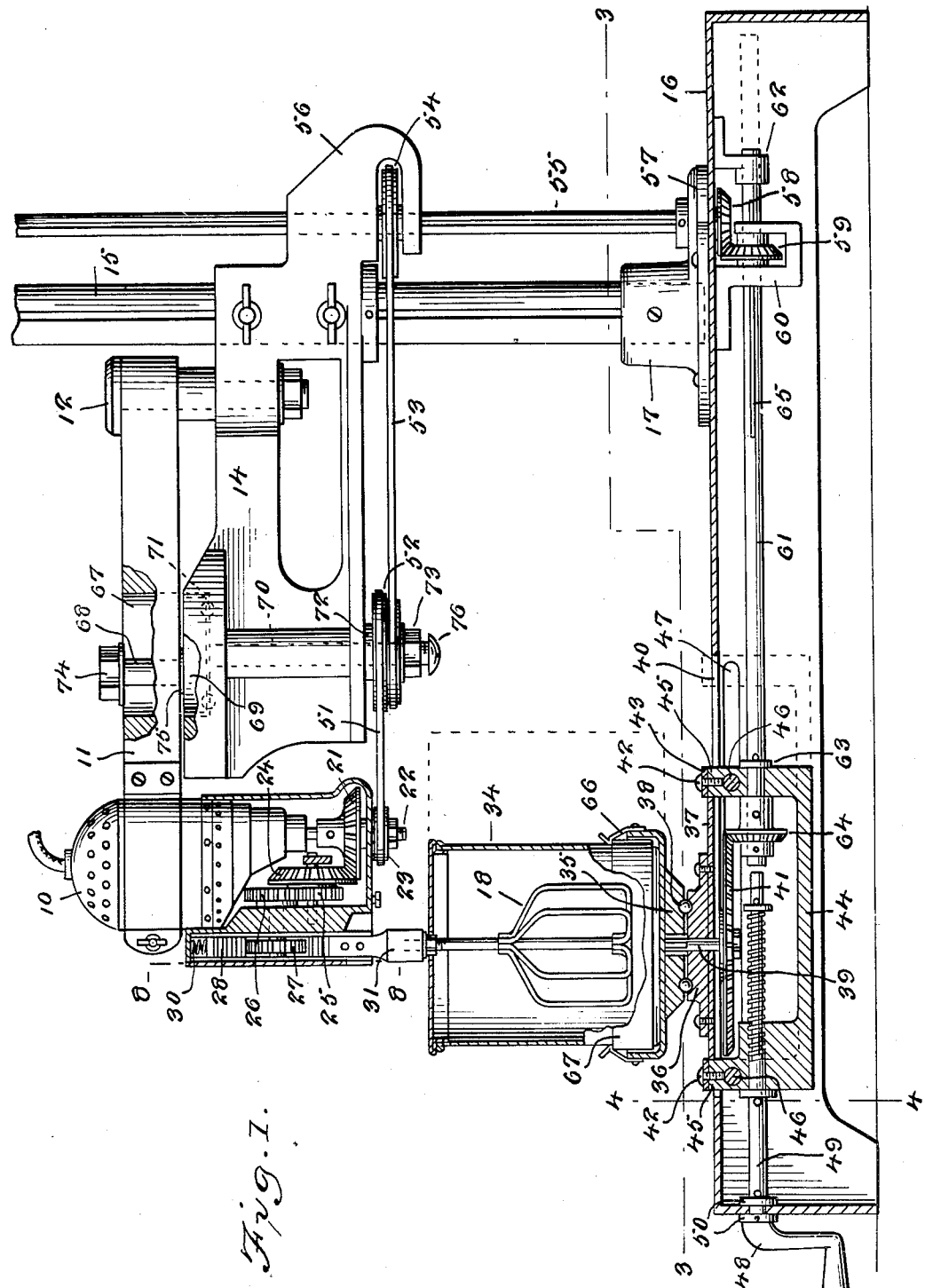
Fig. I.
Walter E. Harvie INVENTOR
BY Victor J. Evans & Co.
ATTORNEY

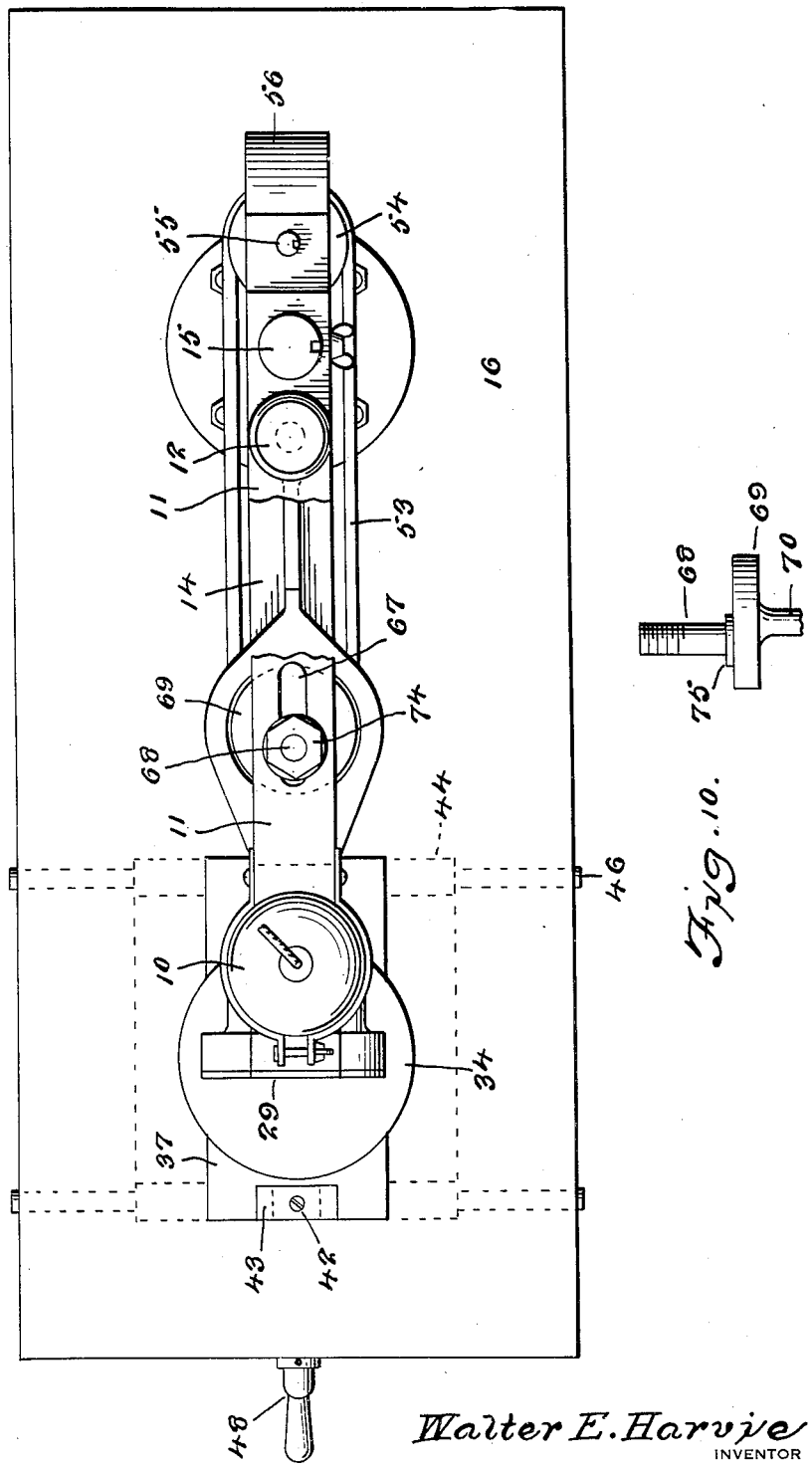

Aug. 29, 1933.   W. E. HARVIE   1,924,991
CULINARY MACHINE
Filed June 8, 1932   4 Sheets-Sheet 3
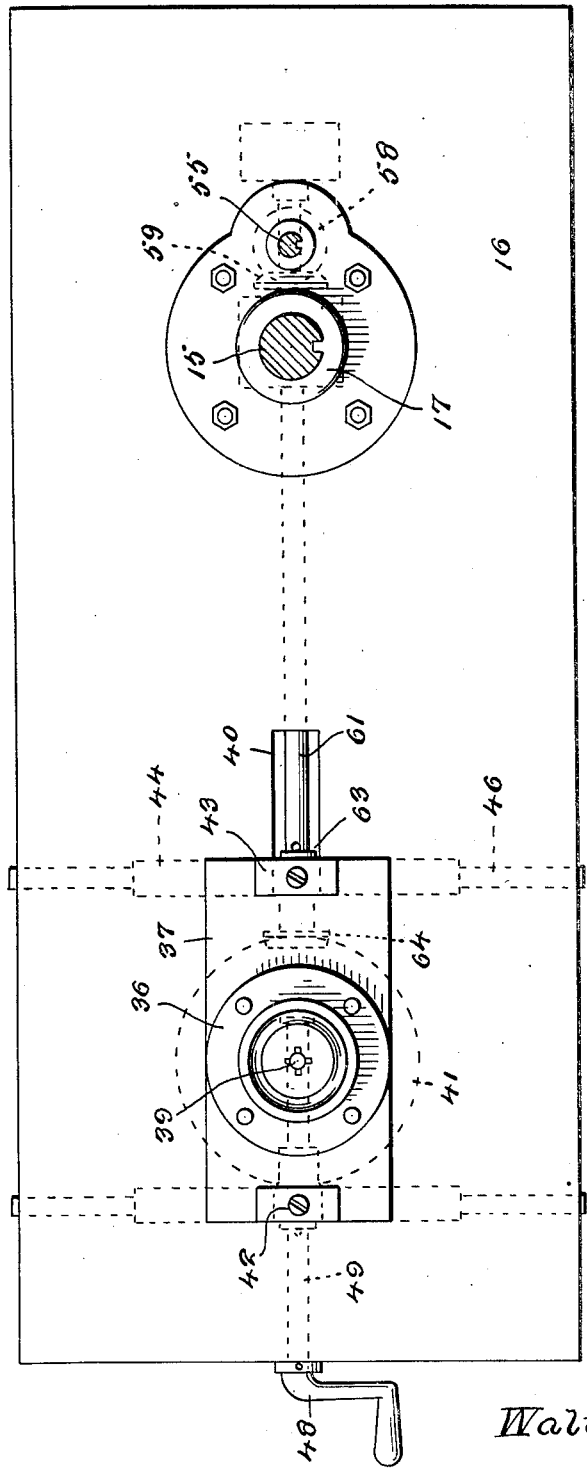
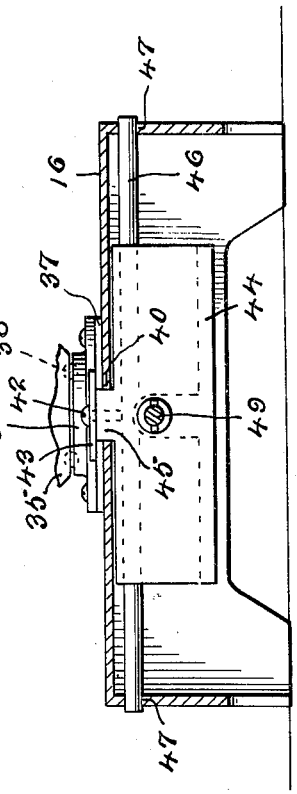
Walter E. Harvie
INVENTOR
BY Victor J. Evans & Co.
ATTORNEY Aug. 29, 1933.  W. E. HARVIE  1,924,991
CULINARY MACHINE
Filed June 8, 1932  4 Sheets-Sheet 4
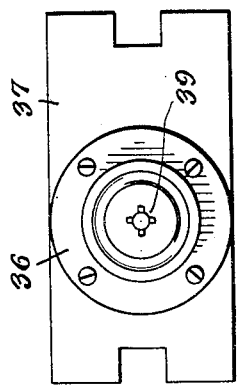
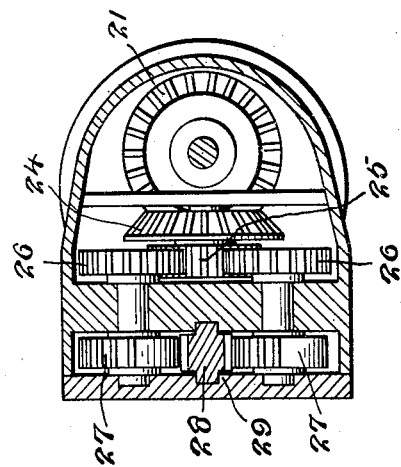
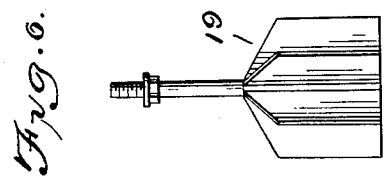
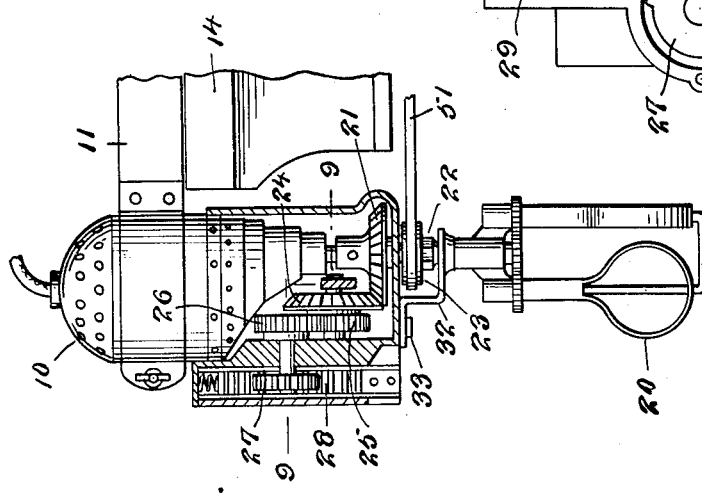
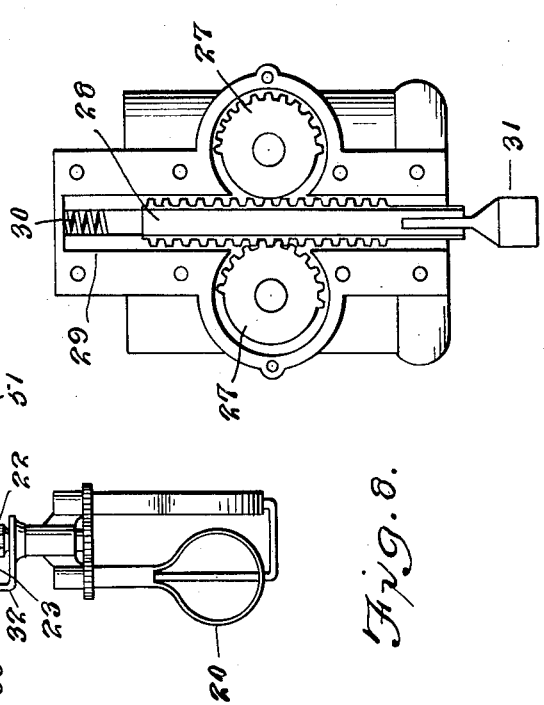
Walter E. Harvie
INVENTOR
BY Victor J. Evans & Co.
ATTORNEY Patented Aug. 29, 1933

1,924,991

UNITED STATES PATENT OFFICE 1,924,991

CULINARY MACHINE

Walter Eldridge Harvie, Portland, Maine

Application June 8, 1932. Serial No. 616,132

7 Claims. (Cl. 259—82)

The object of the invention is to provide a culinary machine particularly adapted to mash or chop any commodity or to effect a mixing or agitation of the same; to provide a machine of the kind indicated which incorporates an implement actuating means and means for bodily swinging the implement laterally during periods of actuation; to provide a machine having a receptacle holder which may be adjusted to most effectively position a receptacle under the implement employed; to provide a construction in which rotary or turning movement is imparted to the receptacle holder in timed relation to the implement actuating means; to provide a machine in which the implement may be adjusted toward or away from a receptacle carried on the receptacle holder; to provide a construction which makes possible the omission of the oscillatory function of the actuated implements while retaining the rotary motion of the receptacle holder; and generally to provide a culinary machine which is of simple form and therefore susceptible of cheap manufacture.

With this object in view, the invention consists in a construction and combination of parts of which a preferred embodiment is illustrated in the accompanying drawings but to which the invention is not to be restricted. Continued use in practice may dictate certain advantages or alterations and the right is claimed to make any falling within the scope of the annexed claims.

In the drawings:

Figure 1 is a side elevational view, partly broken away, of a machine constructed in accordance with the invention.

Figure 2 is a top plan view.

Figures 3 and 4 are sectional views on the planes indicated by the lines 3—3 and 4—4 respectively of Figure 1.

Figure 5 is a view partly in section and partly in elevation of the motor head when equipped with a mixer or beater.

Figure 6 is an elevational view of the chopping implement.

Figure 7 is a top plan view of the top plate comprising the receptacle support.

Figure 8 is a sectional view on the plane indicated by the line 8—8 of Figure 1.

Figure 9 is a sectional view on the plane indicated by the line 9—9 of Figure 5.

Figure 10 is a detail elevational view of the driving head for the oscillatory motor support arm.

The machine when put in motion derives its power from the motor 10 which may be any of the conventional small types of motor actuated from a lamp socket or otherwise. The motor 10 is clamped in an oscillatory support arm 11 swinging on a pivot stud 12 secured to and carried by a carrier arm 14 which is supported on a vertical standard 15, so that the whole may be adjustable bodily toward and away from the base 16 on which the standard is mounted by being carried in the socket member 17 riveted or otherwise secured to the base.

The motor is designed to operate various implements such as a masher 18, a chopper 19 or a mixer or beater 20 and to this end has its shaft coupled with a beveled gear 21 driving the spindle 22 on which a sheave 23 is mounted. The beveled gear 21 is horizontally disposed so as to dispose the spindle 22 vertically and aside from driving the spindle also drives a beveled gear 24 on whose spindle is mounted a pinion 25 meshing with the pinions 26 each of which actuates a mutilated gear 27. The gears 27 are of the general form of spur gears with teeth extending throughout a half of their circumferences and are disposed on opposite sides of a reciprocatory rack 28 mounted in a guide 29 constituting part of the gear supporting structure carried by the motor. The mutilated gears 27 are so related angularly that when the teeth of one mesh with the teeth on the rack, the teeth of the other will be free of its companion teeth on the rack. Since both mutilated gears turn angularly in the same direction and since they alternately engage the rack, the latter is lowered by the one and elevated by the other, so that reciprocatory movement is imparted to the rack which is cushioned at the extremity of the upward movement by a cushioning spring 30. The rack at the lower end is provided with a socket 31 internally threaded for the reception of either the shank of the chopper 19 or the masher 18, the one it being desired to use being engaged with the socket by screwing its shank into the latter.

The chopper and masher are designed for actuation by the reciprocatory rack bar but the mixer or beater 20 is actuated by direct connection with the spindle 22, being coupled to the latter when its supporting bracket 32 is secured to the rack and gear supporting frame of the motor by the attachment of the cap screw 33.

To provide for imparting angular or turning movement to the receptacle, such as indicated at 34, in which the beater, chopper or mixer is to operate, a receptacle support is provided on the base, this support comprising a receptacle table 35 seated upon a block 36, the latter being secured to a plate 37. Anti-friction bearings 38 are interposed between the block and the table and a spindle 39 carried by the latter extends through a slot 40 in the base, below which it receives the large beveled gear 41. Rotary or turning movement imparted to the gear, thus imparts turning movement to the receptacle by which the table is carried. The plate 37 is secured by means of screws 42 and clamp plates 43 to a frame 44 which is disposed within the base with lug portions 45 extending through the slot 40. It is to these lug portions that the screws 42 are attached and these latter, aside from securing the clamp plates 43 in place, also secure in place the rods 46 which extend through the frame 44 and slidably engage in slots 47 formed in the opposite side walls of the base.

This construction provides for sliding movement of the frame and with it the receptacle support toward and away from the standard 15 and in order that this may be made in comparatively small implements, there is provided a crank 48 formed as an integral part of the screw 49, the screw being journaled in the front wall of the base but being precluded from axial movement therein by the collars 50 abutting the front wall of the front and rear faces. The screw is threadingly engaged with the frame 44 and since it may not move axially, angular or turning movement imparted to the screw will move the frame toward and away from the standard 15.

Since the receptacle support is so constructed that angular or turning movement may be given to the receptacle 34, means are provided for deriving this movement from the motor 10. There is therefore trained over the sheave 23 on the spindle 22 a belt 51 which is in turn trained over one of the steps of a double sheave 52 from which a belt 53 extends to a sheave 54, the latter being mounted on the vertical spindle 55 paralleling the standard 15 and loosely extending through an extension 56 formed as an integral part of the support arm 14. The spindle 55 is formed with a longitudinal keyway and the sheave 54 carries a key engaging this keyway, so that when the support arm is adjusted on the standard 15, the sheave 54 may be correspondingly moved on the spindle but without interfering with the operative driving connection between the two. The extension 56 is slotted to provide a clearance for the sheave 54, so that abutments are provided both above and below the sheave that will result in carrying it along by reason of any adjustment of the support arm 14.

The spindle 55 has a lower bearing 57 in the base 16 and on its extremity, below the base, carries a beveled pinion 58 which meshes with a beveled pinion 59, the latter being disposed between the spaced arms of a bracket 60 secured to the under face of the base. By reason of its mounting in the bracket 60, the beveled pinion 59 is incapable of axial movement but at the same time imparts a positive angular or turning movement to the shaft 61 which passes through the arms of the bracket 60, being journaled at one end in the rear bearing 62 on the under face of the base and likewise being journaled in the frame 44 with respect to which it is secured against axial movement by the collar 63 abutting the frame on one face and the hub of the beveled pinion 64 abutting the frame on the other face.

The positive driving connection between the shaft 61 and the beveled gear 59 consists of a key in the latter which slides in a keyway 65 on the former.

The beveled gear 64 mounted at the forward end of the shaft 61 meshes with the beveled gear 41. Thus when the shaft 61 is driven, the receptacle support table will be turned or rotated.

The table 35 of the receptacle support is peripherally flanged, preferably, and provided with spring clips 66 spaced uniformly around this flange. The receptacle 34 which is designed to set on the table is provided with a surrounding band 67 whose upper edge constitutes a shoulder with which the spring clips may engage. Thus the clips serve to releasably secure the receptacle on the table.

The oscillating arm 11 by which the motor 10 is carried is designed to give the implement a lateral back and forth movement in the receptacle and to this end is formed intermediately with a longitudinal slot 67 traversed by the eccentrically disposed wrist pin 68 carried by the disk head 69 of a countershaft 70, the latter being journaled in the vertical bearing in the support arm 14 and the head 69 being housed in a counterbore in the support arm. The thrust of the head is taken by the anti-friction bearings 71.

The countershaft 70 below the support arm is provided with a collar 72 secured to the shaft to constitute a shoulder against which the sheave 52 may abut when the nut 73 is tightened, the nut being threadingly engaged with the lower part of the countershaft. Tightening the nut effects binding engagement on the sheave and forces the latter against the collar 72 so that the sheave, while frictionally secured to the shaft, has a tight enough connection with the latter to drive the shaft. Thus when the motor rotates, the countershaft 70 is set in motion and with it the head 69 and wrist pin 68. Since the latter is disposed eccentrically of the shaft 70, a lateral back and forth movement is imparted to the oscillating arm as the wrist pin is bodily rotated.

The wrist pin is threaded at the upper end for the engagement of a nut 74, which if tightened, clamps the oscillating arm against the shoulder portion 75 of the wrist pin, so that there may be no relative movement of the pin and arm. But this would prevent rotation of the sheave 52 were it not that when it is desired to clamp the arm, provision is made for the free running of the sheave. Then the nut 73 is loosened and backed down against the head of the screw 76 threaded into the lower end of the shaft. The sheave then may rotate freely on the shaft and motion be communicated to the table without communicating it to the arm.

In mashing operations, where the reciprocatory movement is imparted to the implement, it is not necessary to swing the implement laterally. Then, the oscillatory arm may be clamped as aforesaid and the sheave loosened, so that rotary motion may be imparted to the table and thus to the receptacle, in which, if the implement be positioned adjacent one side, all of the product will be subjected to the mashing or chopping action of the implement by reason of it being successively presented to the implement as the receptacle rotates.

In beating and mixing operations, where the implement employed is in the form of that shown at 20, the oscillatory as well as the rotary movements are desirable. Under such conditions, the oscillatory arm should be put into operation, by releasing the nut 74 and tightening the nut 73, when the countershaft 70 will be put in motion and lateral swinging movement given to the implement. Then a thorough mixing or beating of the contents of the receptacle will result by reason of the latter rotating, as well as the implement employed, the implement being likewise swung bodily from one side to the other.

Where the cover is employed on the receptacle, as in the illustration shown in Figure 1, it is of course necessary that the clearance hole for the shank of the implement be disposed at the center or in the axis of the receptacle holder drive shaft, if the receptacle is to be rotated during the mashing or chopping operation. When the oscillatory arm is in operation, it is of course necessary that the cover be omitted.

Motion to the receptacle holder may be dispensed with by removing one of the belts from one of its sheaves.

The invention having been described, what is claimed as new and useful is:

1. A culinary machine comprising a receptacle holder, an implement motor disposed above the receptacle holder to actuate an implement disposed within a receptacle mounted on the holder, an oscillatory support for the motor, a second support carrying the oscillatory support, and means operatively connecting the receptacle holder and oscillatory support to the motor to effect rotation of the holder and oscillatory movement to the oscillatory support.

2. A culinary machine comprising a receptacle holder, an implement motor disposed above the receptacle holder to actuate an implement disposed within a receptacle mounted on the holder, an oscillatory support for the motor, a second support carrying the oscillatory support, and means operatively connecting the receptacle holder and oscillatory support to the motor to effect rotation of the holder and oscillatory movement to the oscillatory support, and means to render the oscillatory support inactive when desired.

3. A culinary machine comprising a receptacle holder, an implement motor disposed above the receptacle holder to actuate an implement disposed within a receptacle mounted on the holder, an oscillatory support for the motor, a second support carrying the oscillatory support, and means operatively connecting the receptacle holder and oscillatory support to the motor to effect rotation of the holder and oscillatory movement to the oscillatory support, and means to render the oscillatory support inactive when desired without disturbance to the operative connections between the motor and the receptacle holder.

4. A culinary machine comprising a base, a standard upstanding from the base, a receptacle holder, an implement motor disposed above the receptacle holder to actuate an implement disposed within a receptacle mounted on the holder, the motor having means to selectively impart reciprocatory or rotary movement to the engaged implement, a latterally oscillating support for the motor, an arm adjustably mounted on said standard and carrying the oscillating support, a rotary support for the receptacle holder, and operative connections between said rotary and oscillating supports and said motor to effect rotation of the rotary support and oscillation of the oscillating support.

5. A culinary machine comprising a base, a rotary receptacle holder mounted on the base, a standard upstanding from the base, a carrier arm mounted on said standard, an oscillatory arm mounted on said carrier arm, a motor carried by the oscillatroy arm and disposed above the receptacle holder, and operative connections between the motor and the oscillatory arm and said holder for actuating both during periods of rotation of the motor.

6. A culinary machine comprising a base, a rotary receptacle holder mounted on the base, a standard upstanding from the base, a carrier arm mounted on said standard, an oscillatory arm mounted on said carrier arm, a motor carried by the oscillatory arm and disposed above the receptacle holder, and operative connections between the motor and the oscillatory arm and said holder for actuating both during periods of rotation of the motor, means for rigidly clamping the oscillatory arm to the carrier arm, and means for releasing the operative connection between the motor and the oscillatory arm.

7. A culinary machine comprising a base, a rotary receptacle holder mounted on the base, a standard upstanding from the base, a carrier arm mounted on said standard, an oscillatory arm mounted on said carrier arm, a motor carried by the oscillatory arm and disposed above the receptacle holder, and operative connections between the motor and the oscillatory arm and said holder for actuating both during periods of rotation of the motor, means for rigidly clamping the oscillatory arm to the carrier arm, and means for releasing the operative connection between the motor and the oscillatory arm, the carrier arm being adjustable toward and away from the base to selectively position the motor with reference to the receptacle holder.

WALTER ELDRIDGE HARVIE.